Aug. 22, 1933.   M. LOUGHEAD   1,923,872
BRAKE MECHANISM
Filed Nov. 6, 1928   2 Sheets-Sheet 1
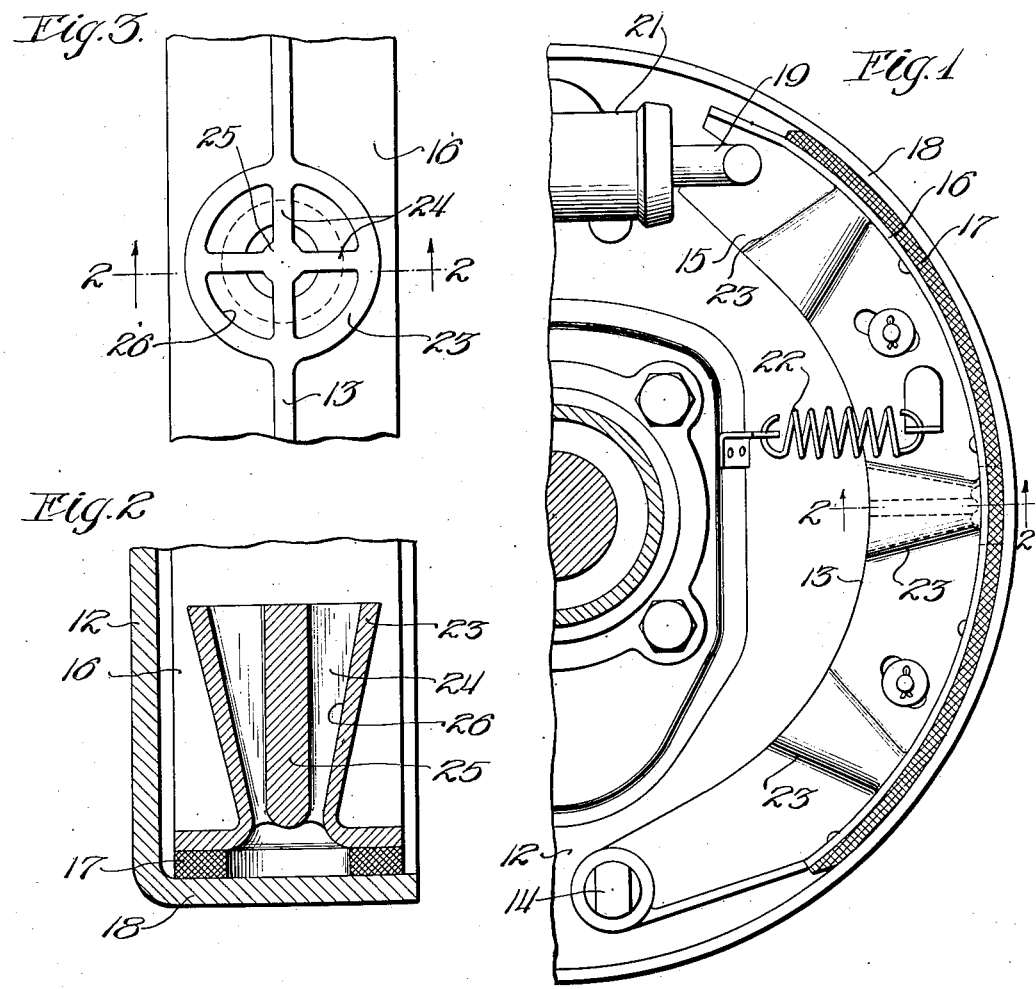
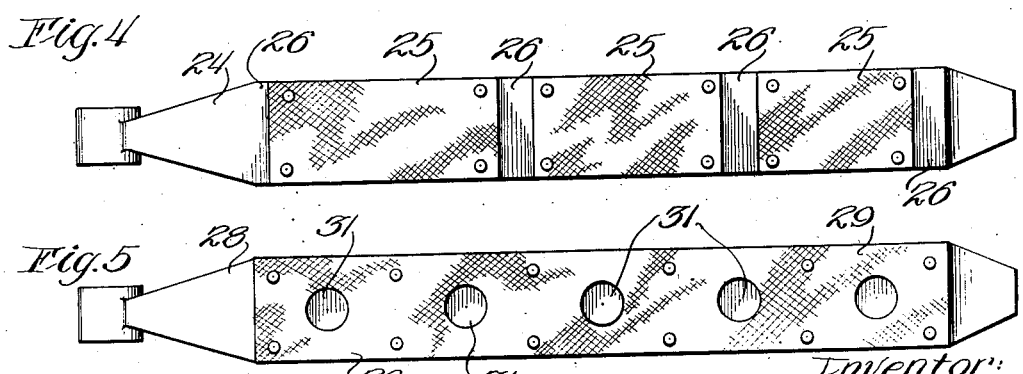
Inventor:
Malcolm Loughead
By Williams, Bradbury, McCaleb & Hinkle
Attys.

Aug. 22, 1933.                M. LOUGHEAD                1,923,872
                              BRAKE MECHANISM
                           Filed Nov. 6, 1928        2 Sheets-Sheet 2
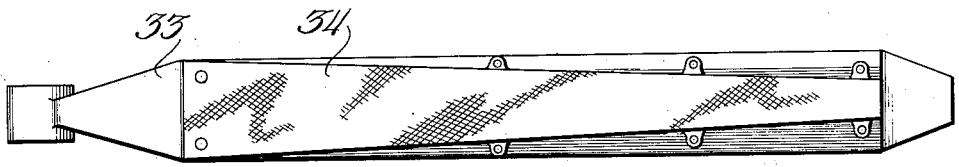
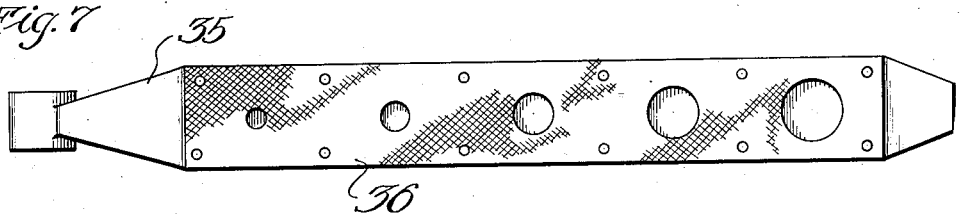
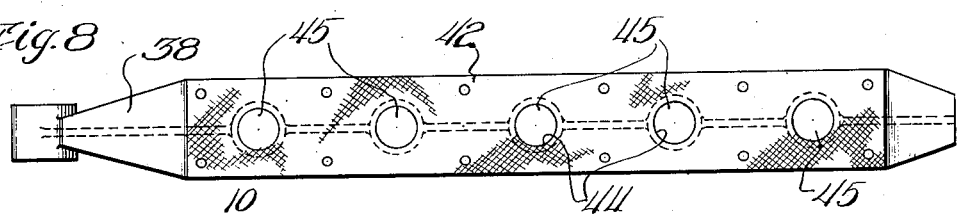
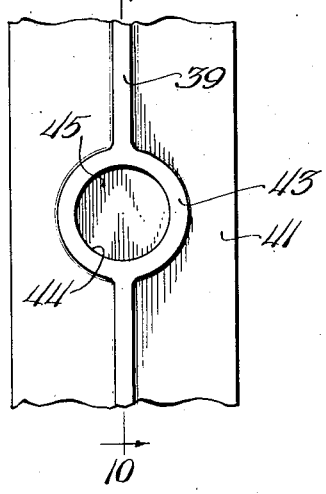
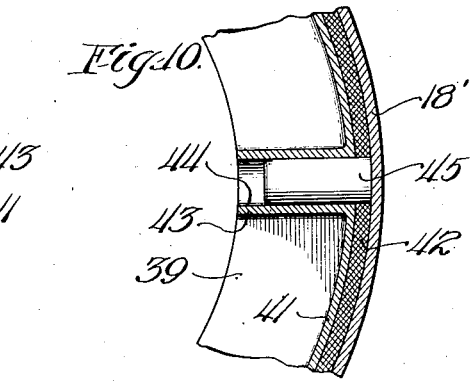
Inventor:
Malcolm Loughead
By Williams, Bradbury, McCaleb+Hinkle
Attys.

Patented Aug. 22, 1933

1,923,872

UNITED STATES PATENT OFFICE 1,923,872

BRAKE MECHANISM

Malcolm Loughead, Detroit, Mich., assignor to Hydraulic Brake Company, Detroit, Mich., a Corporation of California Application November 6, 1928. Serial No. 317,592

2 Claims. (Cl. 188—261)

This invention relates to improvements in brakes, and particularly to improvements in brake shoes.

In the application of brakes, when the brake shoes are engaged with the brake drum with considerable pressure for an extended period, the brake drums become heated and expand. The expansion of the brake drums has several undesirable consequences, one of which is that as the drums expand they move away from the brake shoes requiring an additional pedal movement to keep the shoes in the same braking engagement with the drums. Allowance must therefore be made for a larger movement of the shoe which decreases the maximum ratio of the pressure applied to the pedal with regard to the pressure at the brakes. Another consequence of the expansion of the brake drum is that the center of curvature of the contact surfaces of the shoe and drum will not be the same after the drum is expanded so that the shoe will not make good contact with the drum when the drum is expanded. These difficulties are overcome in this invention by causing an expansion in the brake shoe to offset the expansion of the drum.

An object of the invention is to provide an improved brake mechanism.

A further object is to provide a brake shoe which is expanded by the heat generated in the brake drum to counterbalance the expansion of the brake drum.

A further object is to provide a brake shoe which is adapted to absorb a portion of the heat generated in the brake drum to equalize the expansion of the shoe and drum.

A further object of the invention is to provide means for transferring heat from the brake drum to the brake shoes to cause the shoes to expand equally with the drum.

Other objects and advantages will appear as the description proceeds.

In the drawings, Fig. 1 is a fragmentary side elevation, partly in section, of a wheel brake assembly illustrating one embodiment of the invention.

Fig. 2 is a cross sectional view taken on lines 2—2 of Figs. 1 and 3;

Fig. 3 is a fragmentary plan view of the heat distributing device shown in Fig. 1;

Fig. 4 is a detail view of a brake shoe illustrating a modified form of the invention;

Fig. 5 is a detail view of a brake shoe illustrating another modified form of the invention;

Fig. 6 is a detail view of a brake shoe showing another modified form of the invention;

Fig. 7 is a detail view of a brake shoe showing another modified form of the invention;

Fig. 8 is a detail view of a brake shoe showing another modified form of the invention;

Fig. 9 is an enlarged fragmentary view looking at the shoe of Fig. 8 from the inner side; and Fig. 10 is a sectional view taken on lines 10—10 of Fig. 9.

Referring to the drawings, a support 12 is shown upon which a brake shoe 13 is shown pivotally mounted at 14. Only one half of a complete wheel brake assembly has been shown since the other half is identical. The brake shoe comprises an inwardly extending flange 15 which is integral with an arcuate rim 16 to which a lining 17 is attached in any well known manner as by rivets.

Enclosing the brake shoes is a drum 18 which is secured to a wheel of a vehicle not shown. The brake shoe is engaged with the drum by means of a plunger 19 of a fluid pressure actuated cylinder 21 when it is desired to apply the brakes, and upon the release of the pressure in the cylinder the brake shoe is returned to its normal inoperative position by a spring 22.

An extended application of the brakes causes a large amount of heat to be generated between the brake lining and the drum which is usually absorbed by the drum since the lining is a poor heat conductor. This causes the drum to expand and increase in circumference moving away from the brake shoe and impairing the operation of the brakes.

This difficulty is overcome in the present apparatus by providing means for communicating a portion of the heat of the drum to the brake shoe, thereby causing an expansion of the shoe to counterbalance the expansion of the drum so that the effect of the expansion of the drum is eliminated. Only a portion of the heat of the drum is transmitted to the shoe, but the shoe may be made to have an expansion equal to that of the drum by making it of a material having high coefficient of heat expansion such as aluminum, the expansion due to heat of which is approximately three times that of steel, the material from which the drum is usually made.

In the construction shown, in Fig. 1 a conical heat conducting member 23 integral with the flange and rim of the shoe is provided. The heat conducting member 23 has heat absorbing fins 24, contacting with the inner conical wall and extending radially inward from the wall to a central pin 25. The conical wall and the fins form a plurality of passages 26 which extend through the rim of the shoe. The brake lining 17 is cut away just above the passages, thereby permitting heated air at the drum to circulate through the passages and heat the conical member of the shoe, the shoe being made of a good heat conducting material, the heat uniformly distributes itself over the entire shoe causing it to expand. The expanded shoe then bears the same relation to the expanded drum as it did when both were cold causing the brakes to operate uniformly under all conditions.

In the modification shown in Fig. 4 a brake shoe 24 is shown having a brake lining consisting of a plurality of sections 25 which are equally spaced upon the rim of the brake shoe, leaving spaces 26 in which there is no lining and which are exposed to the heat radiated from the heated brake drum. The heat radiated through these spaces is sufficient to cause a brake shoe of a material having a high coefficient of heat expansion to expand equally with the brake drum.

The sections 25 of the lining may be made of progressively varying lengths with the shortest section at the toe of the brake shoe and the longest section at the heel of the brake shoe. In this manner a tapering effect is given to the amount of surface of the brake shoe exposed to the drum, subjecting a larger area of the shoe at the toe of the brake shoe to the heat radiation from the drum than at the heel of the brake shoe. This construction increases the effectiveness of the radiating spaces since it has been found that more heat is generated at the toe of a brake shoe than at the heel of the shoe.

In Fig. 5 a modified form of a brake shoe 28 is shown provided with a brake lining 29 which has a plurality of apertures 31 extending through the lining for exposing portions of the brake shoe to the heat radiation of the drum.

In Fig. 6 a modification is shown of a brake shoe 33 provided with a tapered brake lining 34, the width of which is equal to the rim of the brake shoe at the heel of the shoe and tapering toward the toe of the shoe so that a larger area of the shoe will be exposed to heat radiation at the toe of the brake shoe than at the heel.

Fig. 7 illustrates a modification of a brake shoe 35 provided with a lining 36 having apertures therein similar to those illustrated in Fig. 5, except that the apertures taper in size increasing in size toward the toe of the brake shoe so as to expose a greater area of the shoe to the heat radiation of the drum at the toe of the shoe.

In Fig. 8 a modified form of brake shoe 38 is shown having an inwardly extending flange 39 which carries a rim 41 upon which a brake lining 42 is supported. A cylindrical heat conducting member 43 is formed integral with the flange 39 and rim 41 and has a cylindrical opening 44 extending through the rim. The brake lining 42 is provided with a plurality of apertures in which metallic inserts 45 of a high heat conducting material are retained. The inserts 45 extend into the openings 44 of the heat conducting members 43 and are slidably retained therein. When the brake shoe 38 is moved into frictional engagement with the brake drum 18' insert 45 will contact with the drum 18' and the heat generated in the drum will be conducted through the insert to the heat conducting member of the brake shoe from where it will tend to uniformly distribute itself over the entire brake shoe to cause its expansion.

As the brake lining 42 is worn away the insert 45 will be forced farther into the brake lining causing it to move into the heat conducting member 43 in which it is slidably mounted. The insert 45 will therefore not interfere with the normal braking operation since it is free to recede into the shoe under pressure from the drum, being held in position by the brake lining.

Having described the nature and embodiments of my invention, what I desire to secure by United States Letters Patent is as follows:

1. In a brake mechanism, a brake drum, a brake shoe having a surface opposing the drum, and a lining for the brake shoe having a plurality of apertures therein tapering in size from one end of the lining to the other whereby a portion of the surface of the shoe is subjected to heat radiation from the drum to the shoe.

2. In a brake mechanism, a brake drum, a brake shoe having a surface opposing the drum, a pivotal support for said brake shoe located adjacent one end thereof, and a lining for the brake shoe having a plurality of apertures therein tapering in size from a relatively small aperture at the end of the lining adjacent said pivotal support to a large aperture adjacent the other end of said lining, whereby a portion of the surface of the brake shoe is subjected to heat radiation from the drum to the shoe.

MALCOLM LOUGHEAD.